T. KINGSWOOD.
INCUBATOR.
APPLICATION FILED APR. 4, 1918.
1,301,136.
Patented Apr. 22, 1919.
2 SHEETS—SHEET 1.
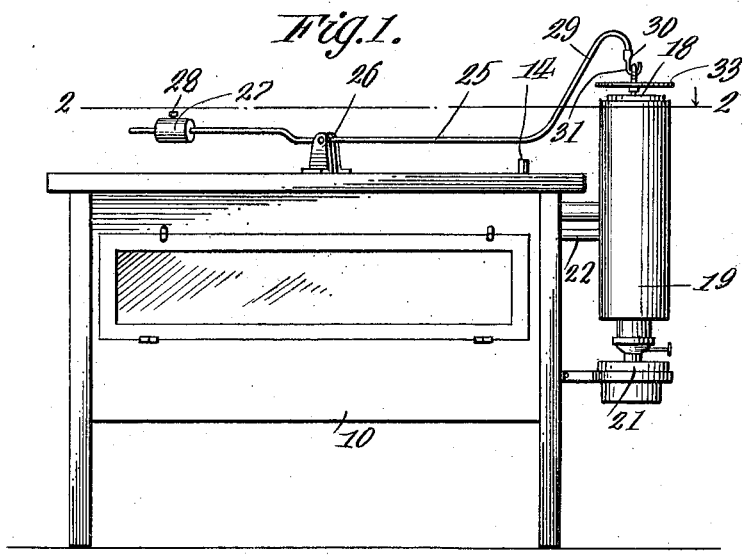
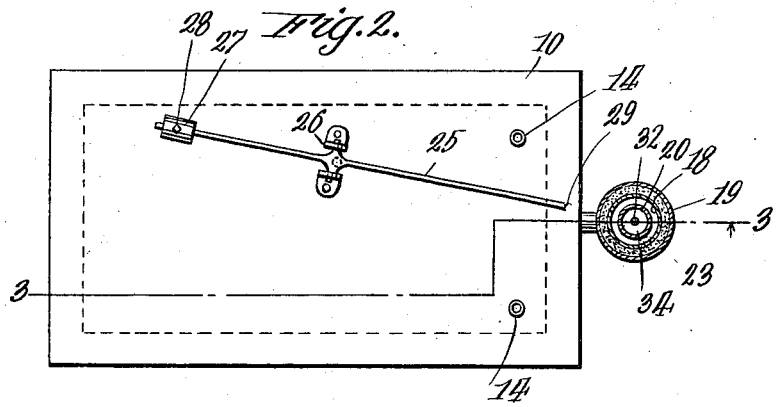
INVENTOR
Thomas Kingswood
WITNESSES
Guy M. Spring
Ross J. Woodward
BY Richard B. Owen,
ATTORNEY T. KINGSWOOD.
INCUBATOR.
APPLICATION FILED APR. 4, 1918.
1,301,136.
Patented Apr. 22, 1919.
2 SHEETS—SHEET 2.
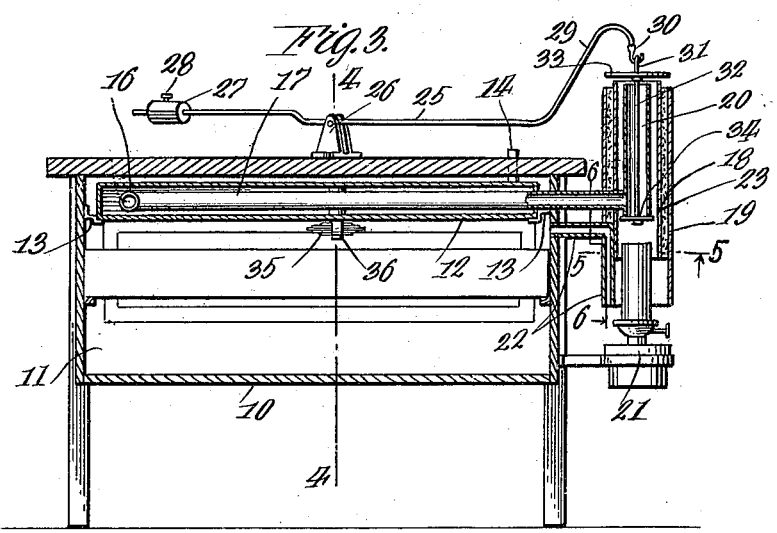
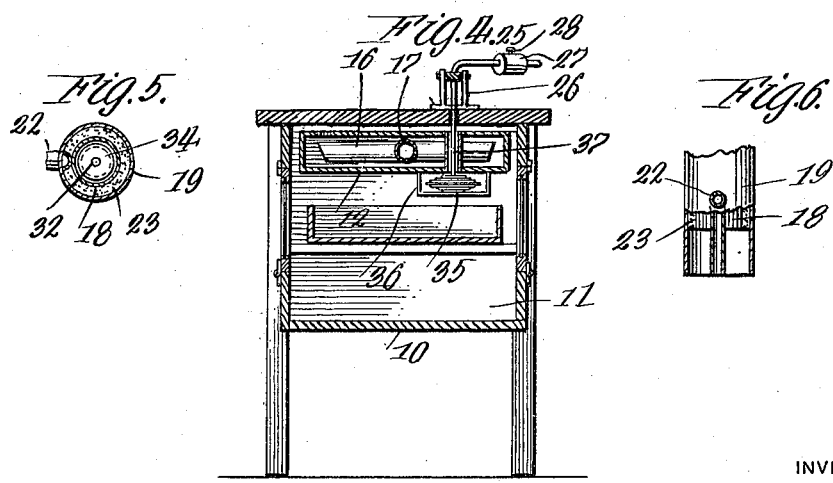
INVENTOR
Thomas Kingswood.
WITNESSES
BY
ATTORNEY

UNITED STATES PATENT OFFICE.

THOMAS KINGSWOOD, OF BRANTFORD, ONTARIO, CANADA.

INCUBATOR.

1,301,136.	Specification of Letters Patent.	Patented Apr. 22, 1919.

Application filed April 4, 1918. Serial No. 226,674.

*To all whom it may concern:*

Be it known that I, THOMAS KINGSWOOD, a subject of the King of Great Britain, residing at Brantford, in the Province of Ontario and Dominion of Canada, have invented certain new and useful Improvements in Incubators, of which the following is a specification.

This invention relates to an improved incubator and the principal object of the invention is to provide an incubator having an improved heating system including means for admitting heated air to the interior of the incubator and means for withdrawing heated air from the incubator and drawing cool air into the incubator when the incubator becomes overheated and it is desired to reduce the temperature.

Another object of the invention is to so construct this heating system that a single valve structure may be used for controlling the inlet of heated air to the incubator and the withdrawing of heated air from the incubator.

Another object of the invention is to so construct this heating system that fresh air may be admitted to the interior of the incubator.

One of the objects of the invention is to provide an improved incubator having an interior heating tank adapted to be directly supplied with heated air from a heating unit disposed at one end and on the exterior of the incubator.

Another object of the invention is to so construct the improved heating system that it will be simple in construction but at the same time, very efficient in operation.

This invention is illustrated in the accompanying drawings, wherein:—

Figure 1 is a view showing an incubator in front elevation and provided with the improved heating system.

Fig. 2 is a top plan view of the incubator with the heating system shown in section along the line 2—2 of Fig. 1.

Fig. 3 is a vertical sectional view through the incubator taken along the line 3—3 of Fig. 2.

Fig. 4 is a vertical sectional view through the incubator taken along the line 4—4 of Fig. 3.

Fig. 5 is a transverse sectional view through the heating system taken along the line 5—5 of Fig. 3.

Fig. 6 is a fragmentary sectional view taken along the line 6—6 of Fig. 3.

Referring to the drawing, wherein is illustrated the preferred form of my invention, and in which like numerals of reference indicate corresponding parts throughout the several views, the housing or body 10 has an interior compartment 11 in which will be placed a flat tank or receptacle 12. This receptacle 12 is supported in the upper portion of the body 10 by suitable brackets 13 and is provided with outlet chimneys 14 extending through the top of the incubator whereby heated air may pass to the atmosphere. The receptacle 12 is further provided with a conducting pipe 17 which extends longitudinally through the tank or receptacle and has the transversely extending manifold or head 16 at its inner end as shown to advantage in Figs. 3 and 4 of the drawing. The opposite end of the pipe 17 extends through the end of the receptacle 12 and through the end wall of the body and also through the inner sleeve 18 and the outer sleeve 19 of the heater casing and communicates with the head 20 positioned in the sleeve 18 in spaced relation thereto as shown in Fig. 3 of the drawing. As this head 20 is above the lamp 21, it will be readily seen that when the apparatus is in operation, the heated air and products of combustion will pass through the pipe 17 and into the receptacle 12. A pipe 22 leads upwardly from the lower end of the outer casing 19 on the interior thereof and has a right angularly extending portion projecting through the casing 19 and into the incubator. It will be further seen that air passing through the pipe 22 into the interior of the body 10 will be heated, thus permitting fresh air to enter the interior of the body but causing this air to be heated when entering for preventing the eggs from being chilled.

An asbestos packing 23 is placed about the sleeve 18 to insulate it from the sleeve 19 and prevent loss of heat.

In order to control the operation of this device, there has been provided a rod 25 pivotally mounted in the bracket 26 and provided at one end with a counter-balance weight 27 adjustably held in place by the set-screw 28 and having its opposite end portion bent upwardly to provide an arm 29 terminating in a hook 30. This hook 30 passes through the eye 31 of the valve rod 32 and as this valve rod carries upper and lower valve disks 33 and 34 respectively it will be readily seen that as the valve rod moves vertically, the valve disks will be moved into and out of engagement with the head 20. When the valve disk 34 is in the operative position as shown in Fig. 3, the heated air and products of combustion will pass out through the sleeve 18 and cause a suction in the head which will draw the heated air and products of combustion from the receptacle 12 and at the same time draw cool air into this receptacle through the chimneys 14 thus reducing the temperature of the incubator but if the valve disk 33 is in closed position, the heated air and products of combustion from the lamp 21 will pass through the pipe 17 into the receptacle 12 and out through the chimneys 14 thus heating the interior of the body 10. In order to control movement of the rod 25 to open and close the valve, there has been provided a thermostat 35 mounted upon the supporting bracket 36 and provided with a stem 37 which stem extends through the top of the incubator and engages the rod 25 as indicated by dotted lines in Fig. 2. It will be readily seen that when the thermostat expands, the rod 25 will be moved to close the valve 34 as shown in Fig. 3 and that when the interior of the incubator cools again, the rod will move downwardly to again open the valve 34 and close the valve 33 and permit the heated air and products of combustion to circulate through the receptacle 12.

What I claim is:

An incubator having a body, a receptacle in the body provided with an inlet and an outlet, a conduit pipe communicating with the inlet, a heater having a casing with the conduit pipe extending through the wall into the interior of the casing, a tubular head carried by the conduit pipe within the casing in spaced relation to the walls thereof and open at both ends and a valve structure including a movable support and upper and lower valve disks, the lower valve disk being positioned beneath the lower end of the tubular head to close the lower end of the tubular head when the upper valve disk is in a raised position and the upper valve disk being positioned above the casing to close the upper end of the said head when the lower disk is in a lowered position.

In testimony whereof I affix my signature in presence of two witnesses.

THOMAS KINGSWOOD.

Witnesses:
ERNEST R. READ,
S. G. READ.

Copies of this patent may be obtained for five cents each, by addressing the "Commissioner of Patents, Washington, D. C."